United States Patent [19]

Moulton

[11] 3,740,750

[45] June 19, 1973

[54] MONOPULSE RECEIVER SYSTEM

[75] Inventor: James A. Moulton, Santa Ana, Calif.

[73] Assignee: North American Aviation, Los Angeles, Calif.

[22] Filed: Aug. 29, 1962

[21] Appl. No.: 221,653

[52] U.S. Cl............. 343/119, 328/145, 343/7 TA, 343/16 M, 343/113 R
[51] Int. Cl............................................. G01s 3/22
[58] Field of Search................ 343/16, 7 TA, 16.1, 343/119, 113; 328/145

[56] References Cited
OTHER PUBLICATIONS

R.C.A. Review, March 1957, pp. 98–102 relied on from article covering pp. 95–135.

Tele–Tech and Electronic Industries, Feb. 1956, pp. 66–68, 126–129.

Primary Examiner—Benjamin A. Borchelt
Assistant Examiner—Richard E. Berger
Attorney—William R. Lane, L. Lee Humphries and Rolf M. Pitts

EXEMPLARY CLAIM

1. In a monopulse receiver system having a depressed antenna and having a first and second signal channel indicative of the microwave output from a first and second one respectively of two coplanar antenna elements, target angle detection means comprising: first and second logarithmic gain means responsively connected to said first and second signal channel respectively for providing an output as a logarithmic function of the amplitude of the respective inputs thereto; and a signal amplitude comparator responsively connected to the outputs of said each of said logarithmic gain control means comprising automatic gain control means including video output means and a logarithmic-shaping feedback network responsively coupled to the output of said video output means.

16 Claims, 9 Drawing Figures

INVENTOR.
JAMES A. MOULTON
BY Rolf M. Pitts
ATTORNEY

INVENTOR.
JAMES A. MOULTON

INVENTOR.
JAMES A. MOULTON

ATTORNEY

MONOPULSE RECEIVER SYSTEM

This invention relates to an angle detection monopulse receiver system, and more particularly to an improved monopulse terrain avoidance computer.

The use of multiple antenna elements excited in mutually in-phase time-phase relationship by a source of monopulse energy, and detecting either the time phase difference or amplitude difference between the echo energy received by such antenna elements is well known in the art as means for obtaining target angle information. Such target angle information is determined in either or both of the azimuth or elevation planes, depending on the relative orientation of the antenna elements, and such angle is measured therein relative to the axis of symmetry (e.g., boresight axis) of the combined radiation patterns formed by the antenna elements, as is more fully explained in the literature such as, for example, U. S. Pat. No. 2,933,980 for AN INTEGRATED AIRCRAFT AND FIRE CONTROL SYSTEM, issued Apr. 26, 1960 to J. R. Moore et al.

A mechanization generally employed in the art for providing a quantitative signal indicative of the target angle involves the use of a sum-and-difference monopulse energy system, wherein the return signals received by two coplanar antenna elements are processed by means of magic "T" waveguide sections (or other devices) to provide two signals, $E_\Sigma$ and $E_\Delta$, which are indicative of the sum and difference respectively of the signals received by the antenna elements. The target angle $\beta$ (that is, the target angle measured from the antenna boresight axis) is defined in such a sum and difference monopulse system as the real function of the ratio of the difference signal to the sum signal. Accordingly, the difference signal in such a system is normalized with respect to the sum signal by means of a Fast Automatic Gain Control Circuit (FAGC). In other words, a ratio signal is provided which is indicative of the ratio formed by dividing the difference signal by the sum signal. This ratio signal is then phase detected relative to the sum signal by means of a phase detector in order to provide a signal indicative of the target angle $\beta$.

The effective application of such target angle signal in an airborne terrain avoidance monopulse system has further required the use of electronic multipliers or dividers for generating a video display signal or warning signal, indicating the presence of terrain obstacles within a minimum range and at a height above a desired clearance plane, as is described more fully in U. S. Patent application, Ser. No. 830,675, now U.S. Pat. No. 3,165,740, for TERRAIN CLEARANCE RADAR, filed July 30, 1959 by William E. Stoney, assignor to North American Aviation, Inc., assignee of the subject invention. Hence, multiplication means, division means and phase detectors have been required for such mechanizations. Such complex circuit elements introduce gain and phase tracking errors in the computation of the warning signals. Also, the large number of cumputing functions to be performed by such terrain avoidance monopulse computer mechanizations not only have required more complex circuit elements, but have also required more system adjustments employing complex checkout procedures in maintenance of the system than are required in the system herein described. In effecting the desired computing functions, the complex circuitry employed in the prior art systems must be carefully adjusted to reduce inherent gain tracking and phase tracking differences which result in computing errors or inaccuracies. Because of the gain and phase tracking tolerances required within such a system, the ready interchangeability of post-amplifiers and other electronic packages in the production of such prior art systems is reduced. Even in those systems which generate a warning signal indicative of a required change in flight path angle rather than a clearance plane distance, such degrees of complexity and types of complex circuitry are required. Such a terrain avoidance system employing a display or indication of the necessary changes in flight path angle to maintain a desired terrain clearance distance, is described in U.S. Patent application, Ser. No. 80,491, now U.S. Pat. No. 3,333,263, for THREE DIMENSIONAL DISPLAY FOR TERRAIN AVOIDANCE RADAR, filed Jan. 3, 1961 by A. H. Kazakevicius et al, assignors to North American Aviation, Inc., assignee of the subject invention.

The principal of the subject invention provides a simpler mechanization of a terrain avoidance monopulse computer which employs less complex circuitry and requires fewer adjustments. The simplified mechanization concept avoids the use of such critical components as multipliers, dividers and phase detectors and thus provides increased accuracy. Also such simplified mechanization allows ready post amplifier interchangeability, and allows simpler means for system checkout and maintenance. Further, the warning signal generated is indicative of the maneuver angle or angular change in flight path required to avoid such terrain obstacles as to be suitable for both pilot display and pitch autopilot control functions in which an automatic pilot changes the pitch attitude of the aircraft to avoid the obstacle.

In a preferred embodiment of the concept of the invention, there is provided a monopulse receiver, having a first and second signal channel each responsive to the outputs from at least two coplanar antenna elements. There is also provided terrain avoidance signaling means comprising first and second logarithmic gain control means responsively connected to the first and second signal channels respectively for providing a video output signal indicative of the logarithm of the input thereto. A signal amplitude comparator is responsively connected to compare the outputs of the first and second logarithmic gain control means for providing a video target angle signal output indicative of the amplitude difference therebetween.

There is further provided computer means for comparing the target angle signal with a reference signal for generating a warning signal. Video signal gating means responsively connected to the first and second logarithmic gain control means may also be provided for suppressing the warning signal in the absence of a combined video output from the logarithmic gain control means of less than a predetermined signal limit. Transient suppression means may also be provided for suppressing false warning signals occurring due to system transients.

By means of the above-described arrangement, a terrain avoidance warning signal is generated without employing analog multipliers, dividers or phase detectors. Because logarithmic signaling devices are employed, analog division is effectively accomplished within a limited signal range by comparing logarithmic signals to achieve a signal representing the desired signal ratio.

Further, because the logarithmic difference between several signals is employed, conventional FAGC loops are not required, per se.

In the absence of a target (and hence in the absence of a target angle signal) or when the signal amplitude of the target angle signal is too low to allow accurate computation of a warning signal, the warning signal output is suppressed by the video signal gating means. In this way, erroneous signals are removed without resort to the complexity of a fast automatic gain control circuit. Further, the generation of erroneous warning signals due to system transient response is avoided.

Accordingly, it is an object of the subject invention to provide a simplified terrain avoidance monopulse system.

It is another object of the subject invention to provide a terrain avoidance warning signal indicative of the obstructions above a preselected clearance plane.

It is still another object of the subject invention to provide a terrain avoidance monopulse system having minimum gain and phase tracking errors.

It is a further object of the subject invention to provide signal suppression means in connection with a logarithmic terrain avoidance monopulse receiver for avoiding false warning signals.

It is yet another object of the subject invention to provide a monopulse terrain avoidance receiver relating the obstacles in the terrain with the range of such obstacles.

These and other objects of the invention will become apparent from the following description taken together with the accompanying drawings in which.

In the application of an airborne monopulse system to terrain avoidance applications, it is desirable to control an aircraft to a minimum height of clearance above the terrain in order to minimize detection of the aircraft, while avoiding terrain obstacles which protrude above the general level of the terrain. The purpose of the monopulse terrain avoidance system is to provide a warning signal indicative of such terrain obstacles lying along the projected flight path of the aircraft, and at a range sufficiently distant as to allow an evasive maneuver to be made by the pilot or automatic pilot of the aircraft. However, the generation of a warning signal indicative of only predicted errors in clearance height, regardless of the range of the terrain obstacle, does not provide an adequate indication of the required maneuver angle or require change in the flight path angle for avoiding such obstacle. Hence, for a large obstacle producing a large warning signal on the pilot's display indicator, the pilot would be induced to perform a dangerous high "g" maneuver unnecessarily in an attempt to avoid such an obstacle. Similarly, in such a display situation a small obstacle would produce a small or inadequate warning signal, even though at short ranges a violent maneuver might be necessary to maintain a satisfactory clearance distance relative to such obstacle. Accordingly, a preferred target warning signal and display indication would provide an indication of the change in flight path required to avoid such terrain obstacle. In this way, a proper cue is presented to the pilot whereby either unnecessarily violent maneuvers or inadequate maneuvers may be avoided. The geometry of such a problem solved by the terrain avoidance computer is shown in FIG. 1.

Figure 1:
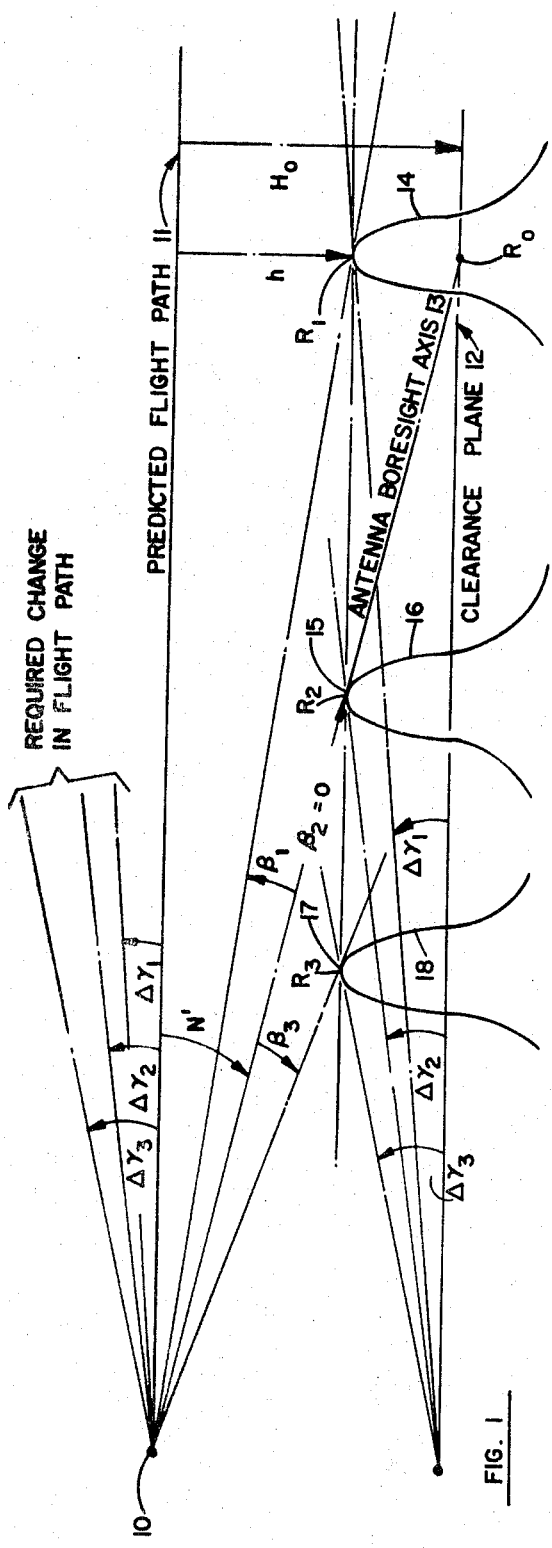
FIG. 1 is a diagram of the geometry of the problem solved by the terrain avoidance computer system.

Referring to FIG. 1 there is illustrated the geometry of the problem solved by the terrain avoidance monopulse system of the subject invention. A low flying aircraft at point 10 is maintaining a flight path or velocity vector indicated by line 11. It is desired to maintain a minimum clearance distance $H_o$ between terrain obstacles and the projected flight path 11, as indicated by clearance plane 12 parallel to and at a distance $H_o$ below flight path 11. Accordingly, the boresight axis 13 of a multilobe monopulse antenna is depressed at an angle $N'$ relative to the flight path in order to detect terrain obstacles protruding above the clearance plane. The angle of depression $N'$ is selected to provide an intersection of the antenna boresight axis with the clearance plane at a range which allows sufficient maneuvering margin or distance within which the aircraft may be controlled so as to avoid the terrain obstacle, while at the same time providing adequate monopulse system angular resolution. For clearance heights, $H_o$, of 280 and 2800 feet, an intersection range of about 10 miles has been successfully employed.

The angle $N'$ is actually comprised of a fixed angle $N$ at which the monopulse antenna is depressed relative to the flight reference line (or body axis) of the aircraft, and the angle of attack $\alpha$ of the flight reference line relative to the wind vector:

$$N' = (N + \alpha) \tag{1}$$

Hence, the angle $N'$ may vary during flight as the aircraft angle of attack varies. For a terrain obstacle presenting a reduced clearance, h, with respect to the projected flight path, it is necessary to alter the flight path angle by an amount $\Delta\gamma$ in order to maintain at least the desired minimum clearance $H_o$. The magnitude of $\Delta\gamma$ is determined as the arc-sine of the ratio $(H_o - h)/R$, where: $(H_o - h)$ is the amount by which the terrain obstacle protrudes above the clearance plane, and $R$ is the line of sight range or distance from the aircraft to the obstacle. However, because of the small angles generally involved, such maneuver angle may be expressed in radians as simply the ratio:

$$\Delta\gamma = (H_o - h)/R \tag{2}$$

The expression for the flight maneuver angle of Equation (2) may be developed as a function of the target angle-off-boresight. rewritten the small angle relationships, it is to be observed from FIG. 1 that:

$$h = R(N' - \beta) \quad (3)$$

Therefore, the required maneuver angle necessary to maintain a minimum clearance $H_o$, with respect to the terrain obstacle, may be reqritten by substituting Equation (3) in Equation (2):

$$\Delta\gamma = H_o - R(N' - \beta)/R \quad (4)$$

$$\Delta\gamma = (H_o/R) - N' + \beta \quad (5)$$

FIG. 1 demonstrates, for a given boresight angle $N'$, the effect upon the target angle $\beta$ and the maneuver angle $\Delta\gamma$ as the range of the aircraft closes, with respect to a particular terrain obstacle which presents a clearance, which is less than the desired minimum clearance $H_o$. Where the target 14 is detected at an initial range $R_1$, approximately at the intersection of the boresight axis with the clearance plane, the target angle off boresight $\beta_1$ has a singular magnitude and sense. Further, because the range $R_1$ approaches (e.g., is approximately equal to) the boresight range $R_o$ to the clearance plane, it is to be appreciated that the small angle represented by the ratio $(H_o/R)$ approaches or is equal to the depression angle $N'$. Therefore, the maneuver angle $\Delta\gamma_1$ is essentially defined by the target angle off boresight, $\beta_1$:

$$\Delta\gamma_1 = (H_o/R_1) - N' + \beta_1 \quad (6)$$

$$\Delta\gamma_1 \approx \beta_1, \text{ where } (H_o/R_1) = N' \quad (7)$$

As the range closes to the point 15 (representing a range $R_2$), where the boresight axis is tangent with terrain obstacle 16, the angle off boresight $\beta_2$ is zero. Accordingly, the required maneuver angle $\Delta\gamma_2$ is defined by the range of the obstacle:

$$\Delta\gamma_2 = (H_o/R_2) - N' + \beta_2 \quad (8)$$

$$\Delta\gamma_2 = (H_o/R_2) - N', \text{ where } \beta_2 = 0 \quad (9)$$

As the range closes further, to the point 17 (representing a range $R_3$) the sense of the angle $\beta_3$ is reversed relative to that for $\beta_1$, in defining the maneuver angle $\Delta\gamma_3$. However, such reversal of sense of the variable $\beta$ is compensated for by the increase in the term $(H_o/R)$ as the closing range $R_3$ approaches zero. Accordingly, the maneuver angle $\Delta\gamma_3$, required to maintain the minimum clearance $H_o$, is observed to be greater than either $\Delta\gamma_1$ or $\Delta\gamma_2$. Therefore, it is to be appreciated that the required maneuver angle to maintain a given clearance distance with regard to a fixed terrain obstacle increases as the range to the terrain obstacle decreases.

The device of the subject invention provides novel and improved structure for generating the target angle off boresight $\beta$ for computing the maneuver angle $\Delta\gamma$ of Equation (5). Such means for generating a signal indicative of the target angle $\beta$ is shown in FIG. 2.

Figure 2:
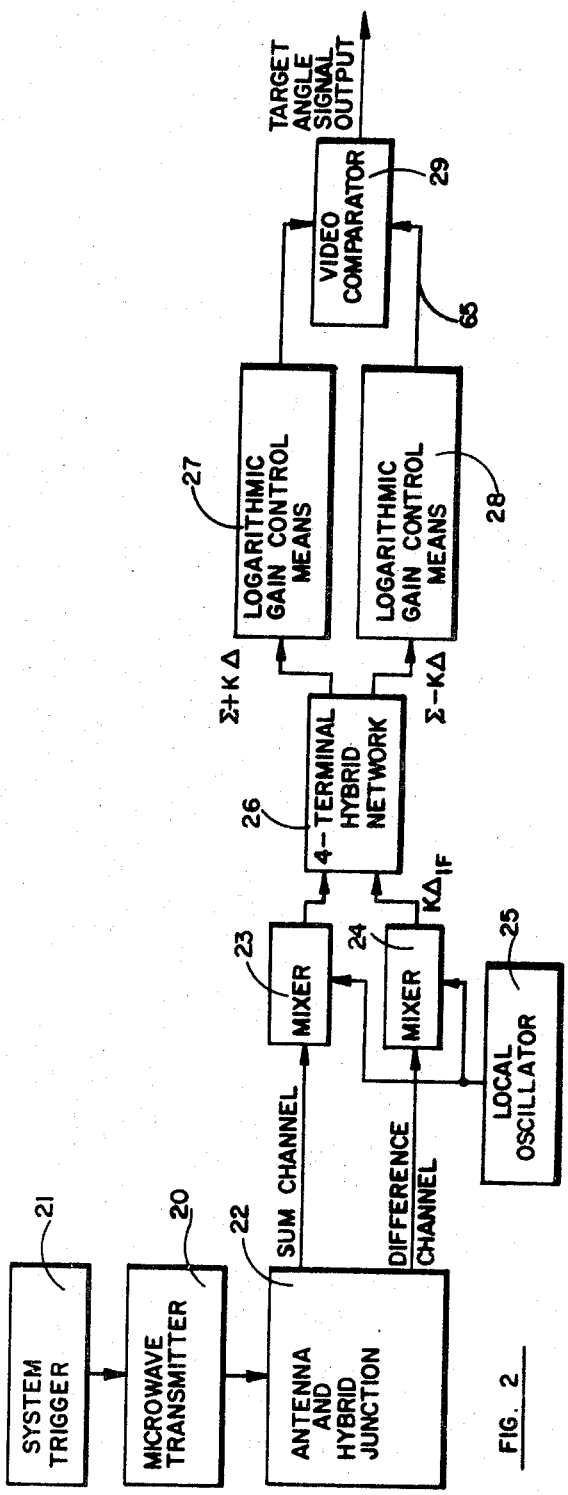
FIG. 2 is a functional block diagram of an exemplary embodiment of the concept of the invention.

Referring to FIG. 2, there is illustrated a functional block diagram embodying one concept of the invention. There is provided a monopulse transmitter 20, system trigger 21, and monopulse antenna 22 including microwave circuitry, such as a hybrid junction for providing a sum channel and difference channel microwave monopulse output. There is further provided a sum channel mixer 23 and difference channel mixer 24 interposed in the sum and difference microwave channels respectively and responsively connected to a local oscillator 25 for providing I.F. signals indicative of the respective microwave outputs of the hybrid junction of element 22. Elements 20, 21, 22, 23, 24, and 25 are all constructed and arranged to cooperate by means well known in the monopulse art and are, therefore, shown in block form only. Such construction and arrangement are described with particularity for example in the abovementioned U. S. Pat. No. 2,933,980 for AN INTEGRATED AIRCRAFT AND FIRE CONTROL AUTOPILOT issued Apr. 26, 1960 to J. R. Moore et al.

It is understood, however, that in an airborne vehicle control application, the boresight axis of antenna 22 is depressed, as described in connection with FIG. 1.

A four terminal sum and difference I.F. network 26 is responsively connected to the outputs of I.F. mixers 23 and 24 to provide a first I.F. signal $(\Sigma + K\Delta)$ indicative of the sum of the inputs thereto, and a second I.F. signal $(\Sigma - K\Delta)$ indicative of the difference between the inputs thereto. Such a device may be comprised of a four terminal hybrid transformer as is employed in the telephone art, or may be comprised of a combination of 90° and 270° phase-shift cables, or other means well known in the art for providing a first and second I.F. output signal indicative of the sum and difference respectively of two I.F. input signals.

There is further provided a first and second logarithmic gain control means 27 and 28 responsively connected to a first and second output respectively of four terminal network 26 for providing video outputs indicative of the logarithm of the amplitude of the respective I.F. inputs thereto. The video outputs of logarithmic gain control means 27 and 28 are fed to a video comparator 29 for providing a target angle signal indicative of the amplitude and sense of the difference between such outputs. Hence, it is to be understood that the output of the video comparator 29 is indicative of the target angle off boresight $\beta$.

Figure 3:
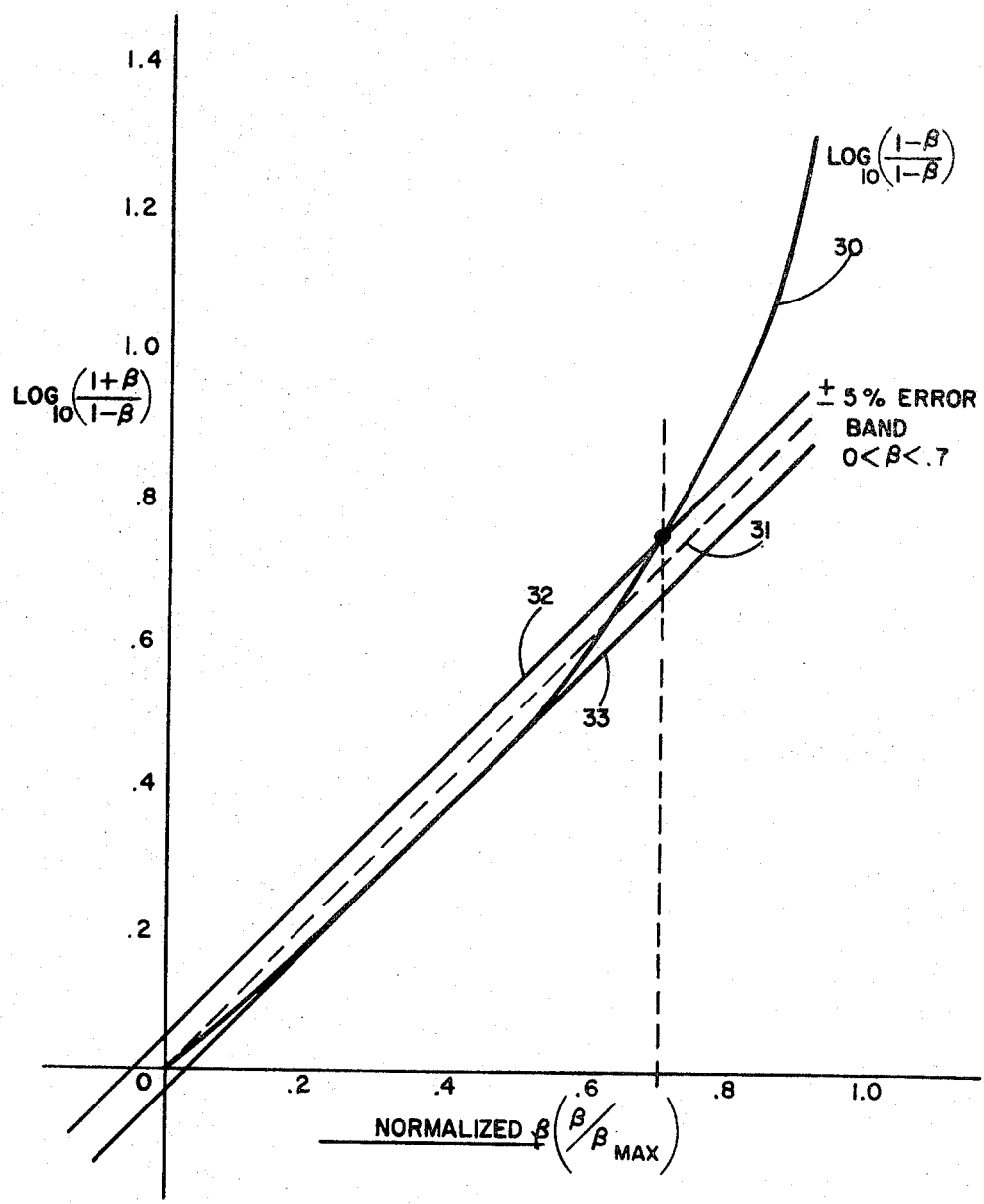
FIG. 3 is a graph of the function $\log_{10}[(1+\beta)/(1-\beta)]$ versus $\beta$ target angle off the boresight axis of the radar antenna).

That the relationship, $(\log(\Sigma + K\Delta) - \log(\Sigma - K\Delta))$ is representative of the target angle $\beta$ within a limited range of values of $\beta$, is to be appreciated from a consideration of FIG. 3.

Referring to FIG. 3, there is illustrated a graph of the function $\log_{10}[(1+\beta)/(1-\beta)]$ plotted versus angle-off-boresight, $\beta$. Such mathematical relation is represented by curve 30. The angle $\beta$ has been normalized relative to a maximum detectable boresight angle $\beta_{max}$ which is determined by the linear response characteristic of the specific antenna design employed. The angle, $\beta = 1.0$, represents $\beta_{max}$. Also shown in FIG. 3 is a linear curve 31 representing the function $\beta$ versus $\beta$. Parallel to line 31 and equally spaced on opposite sides of line 31 are lines 32 and 33 defining a band representing deviation in linearity of ± 5 percent of a full scale value or $\beta_{max}$ as determined by the antenna design. Such band is selected as representing a reasonable or acceptable tolerance on a $\beta$ signal generator for the applications made in a terrain avoidance monopulse computer.

It is to be observed that the function $\log_{10}[(1 + \beta)/(1 - \beta)]$ (curve 30 in FIG. 3) approximates the linear $\beta$ curve 31 within the ± 5 percent limit for magnitudes of $\beta$ not exceeding 0.7 of the full scale value of $\beta$. Therefore, within this limit the value of the expression $\log_{10}[(1 + \beta)/(1 - \beta)]$ may be assumed to be equal to the value of $\beta$ itself. In equation form FIG. 3 illustrates that:

$$\log_{10}[(1 + \beta)/(1 - \beta)], \quad (10)$$

where $\beta \leq 0.7\beta_{max}$.

It is further recalled that the target angle off boresight $\beta$ in a sum and difference monopulse receiver is related to the amplitude ratio of the sum and difference signals ($\Sigma$ and $K\Delta$ respectively) within limits, as follows:

$$\beta = K\Delta/\Sigma, \quad (11)$$

where the constant K is a function of the monopulse system gain and antenna design.

Substituting Equation 2 into Equation 1:
$$\beta = \log[(1+K\Delta/\Sigma)/(1-K\Delta/\Sigma)] = \log[(\Sigma +K\Delta)/(\Sigma -K\Delta)] \quad (12)$$

Recalling that the logarithm of the ratio of two functions is equal to the difference between logarithm of the two functions, Equation 12 may be rewritten as follows:

$$\beta = \log(\Sigma +K\Delta) - \log(\Sigma -K\Delta) \quad (13)$$

It is thus evident that the functional block diagram of FIG. 2, in providing a signal indicative of the difference between the logarithmic amplitudes of $(\Sigma +K\Delta)$ and $(\Sigma -K\Delta)$, thereby provides a signal indicative of the target angle $\beta$ without the necessity of employing a phase-detector for sense indication nor signal division means to effect a ratio of two signal amplitudes.

It is observed that curve 30 of the function $\log_{10}[(1 + \beta)/(1 - \beta)]$ in FIG. 3 becomes increasingly non-linear for values of $\beta$ beyond the normalized value of 0.7. However, this non-linear effect can be lessened and the effective linear range extended beyond the normalized angular range of 0.7 by employing a nominal phase shift of about 15° between the sum and difference ($\Sigma$ and $\Delta$) signals prior to forming the logarithmic ratios of $(\Sigma +K\Delta)$ and $(\Sigma-K\Delta)$. Such phase shift may be readily effected at the microwave bridge structure of element 22 in FIG. 2 by adjustment of the phase calibration buttons normally included and provided for calibration and adjustment of such devices.

The effect of such phase shift provides a small quadrature component that remains when the magnitudes of in-phase components of $\Sigma$ and $\Delta$ approach each other (e.g., as normalized $\beta$ approaches 1.0); such that the amplitude of the term $(\Sigma -K\Delta \angle 15°)$ cannot go to zero. In this way, the function $\log((\Sigma +K\Delta)/(\Sigma -K\Delta))$ of Equation 12 tends less to attempt to describe the function, $$\log[(\Sigma +K\Delta)/(\Sigma -K\Delta)] \to \infty, \text{ as } K\Delta \to \Sigma \quad (14)$$

In other words, the amplitude of the term $(\Sigma -K\Delta)$ cannot go to zero as $K\Delta$ approaches the value of $\Sigma$ due to a small quadrature component of $K\Delta$. Hence, the amplitude function does not become as non-linear as the curve 30 in FIG. 1. Accordingly, the effective linear range of the device of FIG. 2 may be extended to normalized values of $\beta$ above 0.7, and the linearity improved from ±5 percent to within ±3 percent for $\beta = 0.7$.

Figure 4:
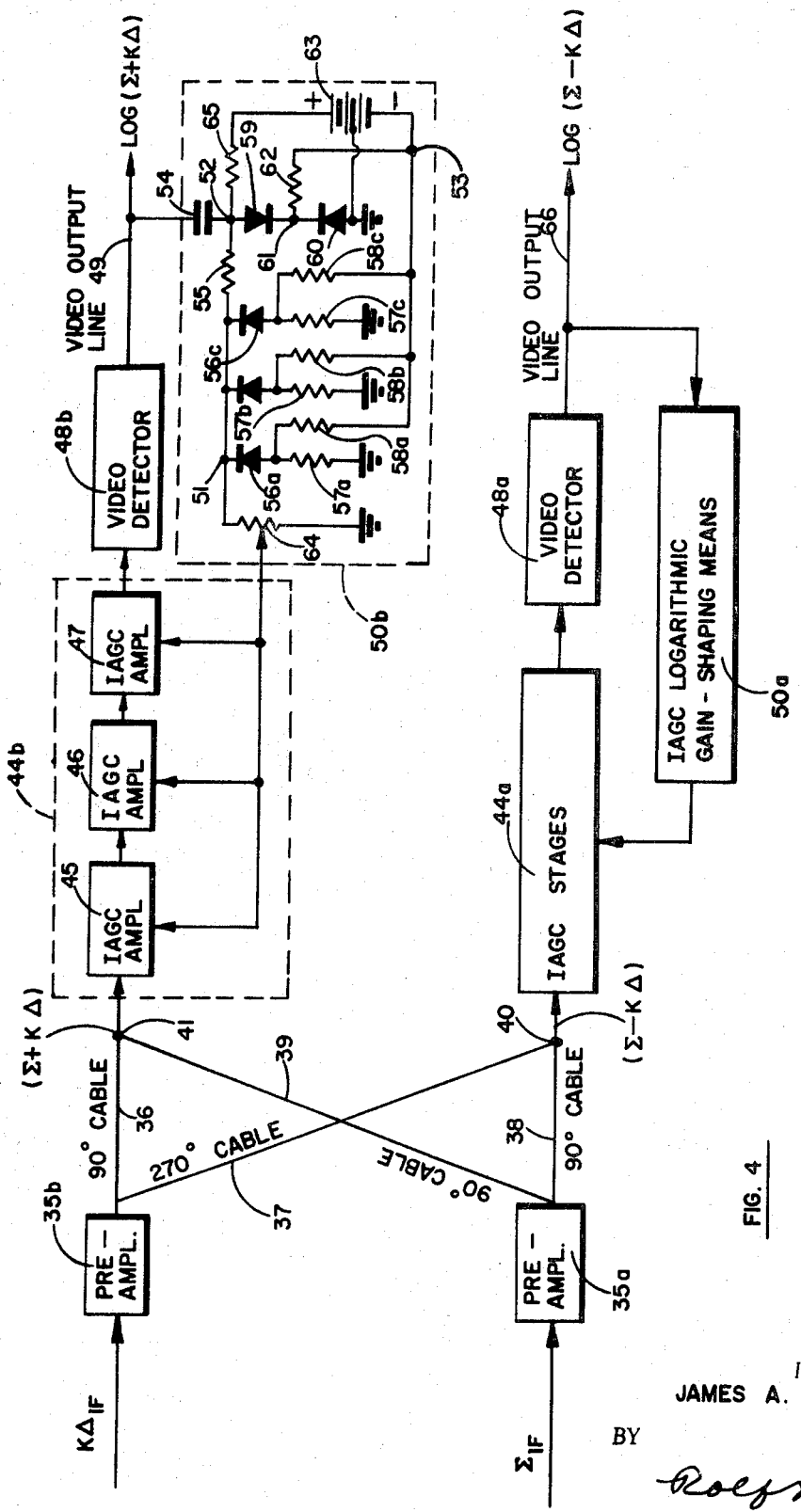
FIG. 4 is a schematic diargam of the logarithmic device of FIG. 2.

One means of conveniently modifying a sum-and-difference monopulse angle detector, in eliminating the phase detector required for such prior art mechanization, is to retain the IAGC (Instantaneous Automatic Gain Control) units, and modify the feedback loops to provide logarithmic gain shaping, as shown in FIG. 4.

Referring to FIG. 4, there is illustrated a schematic diagram, partially in block, of the logarithmic receiver portion of the monopulse system of FIG. 2. There is provided an IF signal source of sum signal $\Sigma$ and a second IF source of a difference signal $K\Delta$. Such gain ratio K of the difference signal relative to the sum signal may be provided by adjusting the gains of an IF pre-amplifier 35a and 35b interposed in respective ones of the sum and difference channels. The construction and arrangement of such pre-amplifiers are well known in the art, and therefore these elements are not shown in schematic detail.

The IF signals $\Sigma$ and $K\Delta$ are combined by means of cables 36, 37, 38 and 39 to provide IF signals $(\Sigma +K\Delta)$ and $(\Sigma -K\Delta)$ at terminals 40 and 41, respectively. The IF input signal $(\Sigma +K\Delta)$ is obtained at input terminal 40 by providing a 90° phase shift cable 38 responsively connected to the output of sum channel pre-amplifier 35a and a 270° phase shift cable 37 responsively connected to the output of the difference channel pre-amplifier 35b, and commonly connecting the outputs of cables 39 and 37 to terminal 40. Hence, the IF difference signal is shifted 180° relative to the IF sum signal, whereby the combination of the two phase shifted signals at 41 is indicative of the difference therebetween, $(\Sigma -K\Delta)$.

Similarly, the IF input signal $(\Sigma +K\Delta)$ is obtained at terminal 41 by providing a 90° phase shift cable 39 responsively connected to the output of sum channel pre-amplifier 35a and a 90° phase shift cable 36 responsively connected to the output difference channel pre-amplifier 35b, and commonly connecting cables 39 and 36 to input terminal 41. Hence, the IF difference signal is in phase with the IF sum signal, whereby the combination of the two phase shifted signals at terminal 40 is indicative of the sum of them, $(\Sigma +K\Delta)$. Further, the 90° phase shifted $(\Sigma +K\Delta)$ signal is in phase with the 90° phase shifted signal component of the $(\Sigma -K\Delta)$ IF signal.

It is to be appreciated that where the waveguide structure associated with the microwave antenna 22 of FIG. 2 provides microwave output signals in the forms of $(\Sigma +K\Delta)$ and $(\Sigma -K\Delta)$ directly, then such structure for providing a $(\Sigma +K\Delta)$ and a $(\Sigma -K\Delta)$ IF signal are not required.

There is further provided first and second automatic gain control means including logarithmic gain control shaping networks for providing video output signals indicative of the logarithm of the IF inputs ($\Sigma + K\Delta$) and ($\Sigma - K\Delta$), respectively. Each automatic gain control means is comprised of an automatic gain control stage 44, a video detector 48, and logarithmic gain shaping means 50, the reference letters "a" and "b" being appended to the reference numerals of those elements to distinguish the ($\Sigma - K\Delta$) and ($\Sigma + K\Delta$) channels, respectively. A first video output signal indicative of the logarithm of ($\Sigma + K\Delta$) occurs on output line 49, and a second video output indicative of the logarithm of ($\Sigma - K\Delta$) occurs on output line 66. The two automatic gain means are identical in construction and arrangement; therefore, a description of the automatic gain control means for the ($\Sigma + K\Delta$) channel will suffice to explain the structure common to the ($\Sigma - K\Delta$) channel.

The automatic gain control stage 44b is comprised of a plurality of gain controlled amplifiers 45, 46, 47 (termed "Instantaneous Automatic Gain Controlled Amplifier," or IAGC amplifiers) operatively connected in cascade, the output of each amplifier being fed to the input of a succeeding one. An input of first IAGC amplifier 45 is responsively connected to IF signal terminal 41, while the output of last IAGC stage 47 is fed to a video detector 48b which provides a video output on line 49. The construction of IAGC amplifiers 45, 46 and 47 and video detector 48b is well known to those skilled in the art, and therefore these elements are shown in block form only.

The video output on line 49 is commonly fed back as an automatic gain control signal to each of the automatic gain control amplifier stages to provide fast (or so called instantaneous) automatic gain control of the video output. Gain shaping of the instantaneous automatic gain control signal is provided by means of a gain shaping network 50 to provide an output on line 49 which is indicative of the video envelope of the IF input at terminal 41.

The gain shaping network 50 is comprised of an output terminal 51, an input terminal 52, and input-output ground terminal, and a bias terminal 53. Input terminal 52 is responsively coupled to the video output line by means of capacitor 54. A series resistor 55 interconnects input terminal 52 and output terminal 51 of the shaping network 50. There is further provided a plurality of like-poled back-biased diode circuits, each comprising a diode 56, a current limiting resistor 57, and a back biasing resistor 58, a like electrode of each of the diodes being commonly connected to output terminal 51. Each current limiting resistor 57 interconnects a second electrode of an associated diode 56 and the output ground terminal, the second electrode being further interconnected with biased terminal 53 by means of an associated mutually exclusive one of back-biasing resistors 58. Corresponding elements of each of the like-poled diode circuits are mutually distinguished by mutually exclusive letter subscript to the common reference character. Hence, the diode of the first, second, and third diode circuit is designated 56a, 56b, and 56c respectively, for example.

A pair of series-connected, oppositely-poled diodes 59 and 60 are connected in circuit across input terminal 52 and the ground terminal of the network, a first one 59 of the pair of diodes being connected to the input terminal 52 and being oppositely-poled relative to the plurality of like-poled diodes 56a, 56b, and 56c. The series interconnection or common terminal 61 of the pair of series diodes is interconnected with network bias terminal 53 by means of a bias impedance 62. A centertapped source 63 of d-c potential is connected in circuit across input terminal 52 (through a resistor 65) and bias terminal 53 of the shaping network for back-biasing the plurality of diode circuits, the centertap of such source being connected to ground.

The function of diode 59 is to limit the sense or polarity of the feedback signal for gain-shaping purposes, while the purpose of companion diode 60 is to provide a bias to offset or compensate the zero signal bias contributed by diode 59. In this way, improved signal nulls are maintained in response to zero level inputs. Further, because the performance of both of diodes 59 and 60 vary similarly with temperature, such signal null preformance includes temperature compensation.

Connected across the output terminal 51 and the ground terminal is a load impedance comprised of a potentiometer 64, the wiper arm of which is operatively connected to the control inputs of IAGC amplifiers 45, 46 and 47.

The values selected for the current-limiting resistors, back-biasing resistors and the d-c potential source are selected to provide a plurality of parallel impedance elements (57a, 57b, 57c), in series with series resistor 55, whereby the number of conductive parallel impedance paths within a given input voltage range is a function of the voltage range itself. In other words, successive ones of diodes 56a, 56b and 56c are back-biased at successively higher voltages. As the input voltage increases to the value of each successive bias voltage, the number of conductive paralleled impedance paths increase, whereby the effective net impedance of the combined parallel impedance paths decreases. Accordingly, the gain of network 50 is attenuated as a predetermined function of the amplitude of the input to terminal 52. While only three such back-biased, like-poled diode circuits have been shown in FIG. 4, it is to be understood that such number is exemplary only, and that any number of such back-biased networks may be employed to achieve such gain-shaping function. This IAGC signal is then fed back to the control inputs of the IAGC stages 44b to control the gain thereof and, hence, controls the gain of the output of line 49. In this way, the video output signal on output line 49 is made to vary as the logarithm of the envelope of the IF input at terminal 41.

It is to be understood that the ($\Sigma - K\Delta$) channel is comprised of similar structure co-operating in a similar fashion to provide a video output signal on line 66 which is indicative of the logarithm of the envelope of the IF input on terminal 41.

In an operative embodiment of the device of FIG. 4, which was successfully constructed and operated with video signal levels between 0 and −10 volts, the following circuit values were employed for the IAGC gain shaping networks 50a and 50b:

Diodes 56a, 56b, 56c, 61 and 62 = Type FD-100, manufactured by Fairchild Semi-conductor, Inc. of Mountain View, California.

Capacitor 54 = 60 microfarads

Resistor 55 = 422 ohms

Resistor 57a = 1 kilohm

Resistor 57b = 791 ohms

Resistor 57c = 510 ohms

Resistor 58a = ∞ (omitted)
Resistor 58b = 28 kilohms
Resistor 58c = 26.6 kilohms
Resistor 62 = 39 kilohms
D-C Source 63 = 150 volts
Potentiometer 64 = 5 kilohms
Resistor 65 = 2.2 megohms It is to be further appreciated that the two video output signals of FIG. 4 may be severally applied to the several inputs of a differential amplifier or other means for comparing the amplitudes of two video signals to provide a signal indicative of the angle-off-boresight of a terrain obstacle or other monopulse radar target, as shown in FIG. 2. Such target angle signal may then be combined with a reference signal to provide a warning signal $\Delta\gamma$, thereby mechanizing Equation (5), as shown in FIG. 5.

Figure 5:
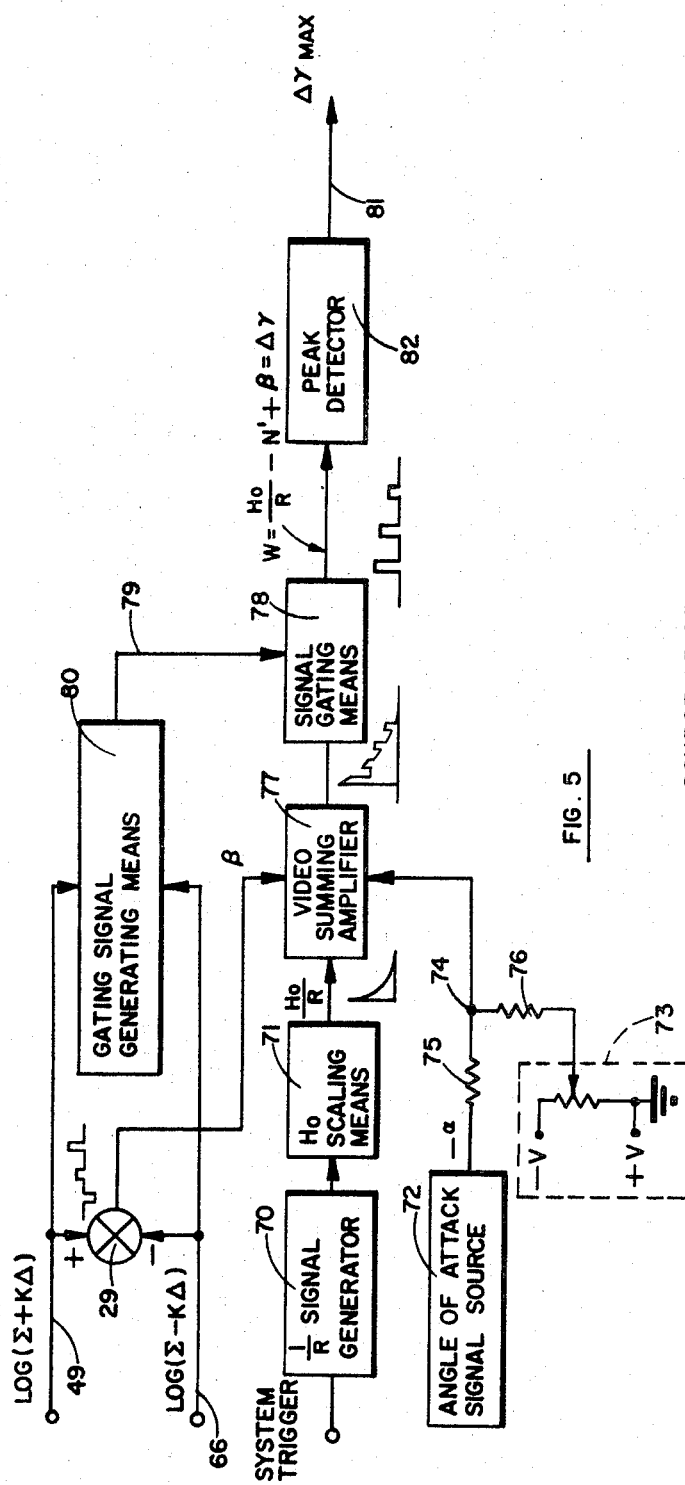
FIG. 5 is a schematic diagram of an examplary warning signal computing means embodying a concept of the invention.

Referring to FIG. 5, there is illustrated a schematic diagram of an exemplary warning signal computing device, embodying a concept of the invention generating a warning signal indicative of the maneuver angle necessary to maintain a specified clearance distance relative to a terrain obstacle. There is provided a signal comparator 29 responsive to a video log($\Sigma + K\Delta$) signal and a video log($\Sigma - K\Delta$) signal for generating a signal indicative of the difference therebetween. There is further provided an inverse function generator 70 responsively connected to the system trigger of FIG. 2 for periodically generating a signal which decreases as elapsed time increases, being indicative of the inverse of elapsed time. Because elapsed time of a received video signal in a monopulse receiver relative to the system trigger is indicative of the range R of the target producing such echo signal, such elapsed time is employed as a measure of radar range. Hence, the signal representing the inverse function of elapsed time is indicative of the inverse of radar range. By gating such $1/R_1$ signal by means of the video signals (to be more fully described hereinafter), a value may be obtained from the inverse range time generator which corresponds to the range of the target represented by such video signal. Hence, signal generator 70 is referred to herein as an inverse range signal generator.

The output of 1/R signal generator 70 is scaled or attenuated by scaling means 71 to provide a signal level or gain indicative of a selected clearance height $H_o$, thereby providing an analog signal indicative of the term $H_o/R$. Such scaling means 71 may be provided by an adjustable attenuation network or potentiometer or other means well-known in the analog computer art for adjusting the gain of a signal.

There is also provided means for generating a d-c signal indicative of the term N', comprising an angle of attack signal source 72 for providing a signal $\alpha$ indicative of the angle of attack of the body axis of the aircraft in which the system of FIG. 2 is installed; and a reference source 73 of an adjustable d-c signal N, indicative of the inclination of the monopulse antenna of FIG. 2 relative to the body axis of the airplane in which the system is installed. The outputs from angle of attack sensor 72 and reference signal source 73 are combined at summing point 74 to provide a signal indicative of the sum $-N' = -(N+\alpha)$. Such signal summing is accomplished by a summing network comprised of a first summing resistor 75 interposed in series circuit between terminal 74 and angle of attack sensor 72, and a second summing resistor 76 interposed in series circuit between terminal 74 and reference signal source 73.

The $-(N+\alpha)$ signal on terminal 74, the $H_o/R$ signal from scaling means 71 and the $\beta$ signal from signal comparator 29 are fed to and summed by summing amplifier 77, to continuously provide an output signal indicative of the sum of the inputs thereto. However, the output of summing amplifier 77 includes a $\beta$ signal component only while, or during the incidence of, the video target signals being received on video input lines 45 and 65 of FIG. 2. During the remaining portion of the period of the periodic system trigger, the output of summing means 77 will not include any $\beta$ signal component.

Signal gating means 78 is interposed at the output of amplifier 77 for gating or suppressing the output thereof in response to a control signal input on control line 79. Thus, it is assured that amplifier 77 provides an output only when a suitable video return signal exists. In order to do this, there is provided gating signal generating means 80 responsively connected to video signal lines 49 and 66 for generating a control signal during the interval when the sum of the video inputs thereto exceeds a predetermined level. The control signal from gating signal generator 80 is fed on line 79 to signal gate 78, whereby signal gate 78 transmits the output of summing amplifier 77 to line 82 during the incidence of the video signals log ($\Sigma + K\Delta$) and log ($\Sigma - K\Delta$) employed in the generation of the term $\beta$. Hence, it is to be appreciated that the output signal, W, appearing on warning signal output line 82 is indicative of the sum:

$$W = (H_o/R_1) - N' + \beta_1 = \Delta\gamma_1$$

(15)

whereby it is appreciated that the device of FIG. 5 provides structure for the mechanization of Equation 5.

Where more than one terrain obstacle lies within the surveillance of the system, then more than one maneuver angle signal, $\Delta\gamma$, will be generated during a given period of the periodic system trigger, each being separated in time occurrence from the others by a time interval corresponding to the difference in the radar range or sightline distance between them. For a flight control application (as distinguished from a mapping application), only the larger of the several maneuver angle signals would be significant, such maximum angle, $\Delta\gamma_{max}$, indicating the minimum maneuver angle necessary to assure the desired clearance distance $H_o$ in such direction or azimuth. Accordingly, a peak detector device 82 may be interposed between output line 81 and signal gating means 78 to provide such significant analog signal indicative of the minimum acceptable maneuver angle, $\Delta\gamma_{max}$, for a given azimuth or heading.

Figure 6:
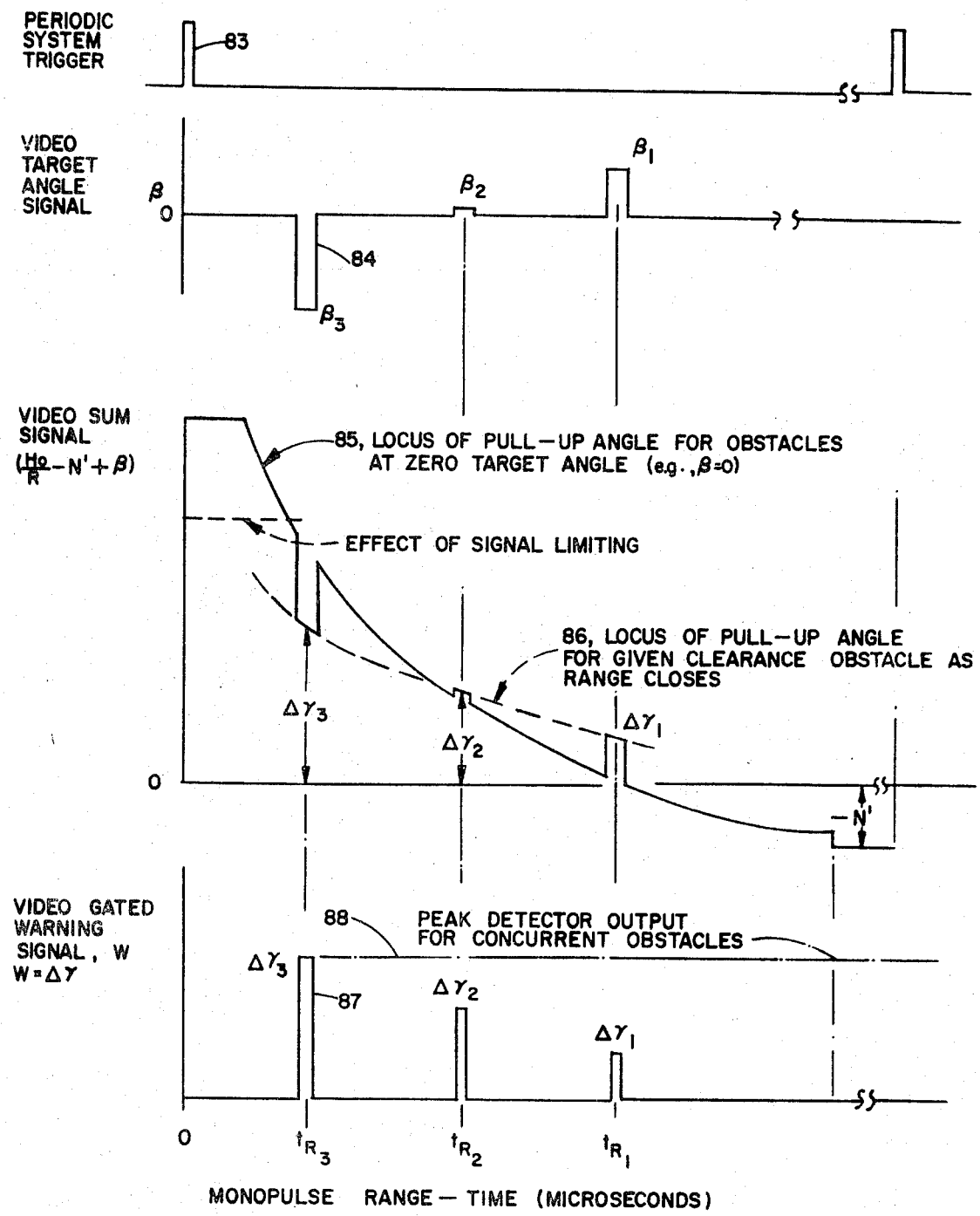
FIG. 6 is a series of representative time histories of the response of the device of FIG. 5.

Normal operation of the above-described system may be more readily appreciated from a consideration of a time history of the representative response of the several elements of FIG. 5, as shown in FIG. 6.

Referring to FIG. 6, there is illustrated a time history of the response of the device of FIG. 5. Curve 83 represents the pulse output of the system trigger which is of course, cyclically repeated at the pulse repetition frequency. Curve 84 represents the response of video comparator 29 for the situation where, say, three targets, of similar height and at different ranges are within the surveillance of the system, as depicted in FIG. 1. Video response curve 84 illustrates (1) the time phase $t_R$ of a video $\beta$ signal relative to the trigger signal, which time phase is indicative of the range of the terrain obstacle; and (2) the amplitude and sense of the angle-off-boresight signal, $\beta$, which are determined by the location and height of the terrain obstacle or target. Hence, the signals $\beta_1$, $\beta_2$, and $\beta_3$, occurring at $t_{R_1}$, $t_{R_2}$, and $t_{R_3}$ respectively, represent the angle-off-boresight of the targets 14, 16, and 18 respectively of FIG. 1.

The curve 85, represents the output of summing amplifier 77 of FIG. 5; and is comprised of the scaled inverse range signal component $H_o/R$ from scaling means 71, biased by an amount $-N'$, indicative of the bias signal at terminal 74 of FIG. 5. Superimposed on this $((H_o/R) -N')$ signal is the $\beta$ signal, curve 84, from comparator 29 of FIG. 5.

It is to be appreciated that if the series of three terrain obstacles in FIG. 1 were all tangent to the boresight line 13 in FIG. 1, then the angle off boresight for each of them (e.g., $\beta_1$, $\beta_2$ and $\beta_3$) would be zero. Hence, the curve $((H_o/R -N')$ defines the locus of pull-up angles, $\Delta\gamma$, for obstacles presenting a zero angle off boresight. However, for the constant or common height illustrated for the terrain obstacles in FIG. 1, a locus 86 of points defined by $\Delta\gamma_1$, $\Delta\gamma_2$ and $\Delta\gamma_3$ illustrates the manner in which the required maneuver angle increases as the range to a given obstacle decreases.

Curve 87 illustrates the effect of gating the response shown in curve 85 by means of signal gating 78, whereby an output signal is provided only during the occurrence of a video signal on video signal lines 49 and 66 of FIG. 5. Hence, a sampled output signal occurs which is indicative of the maneuver angle $\Delta\gamma$ associated with a specific target or terrain obstacle.

Curve 88 illustrates the effect of peak detecting the response shown in curve 87 by means of peak detector 82. Because the equal-height targets or terrain obstacles of FIG. 1 require maneuver angles which increase as the range thereto decreases, the nearest obstacle represented by range time $t_{R_3}$, corresponding to range $R_3$ of FIG. 1, requires a maneuver $\Delta\gamma_3$ which is larger than that required by the other illustrated terrain obstacles. Accordingly the output of peak detector 82, occurring on output line 81 of FIG. 5, is indicative of the maneuver angle $\Delta\gamma_3$. It is to be appreciated, however, that the occurrence of several terrain obstacles within the field of surveillance may produce several maneuver angles any one of which may determine the output from peak detector 82.

Hence, it is to be appreciated that the output on line 81, of FIG. 5, is indicative of the warning signal, $W = +\Delta\gamma_{max}$.

It is to be further appreciated that as the negative target angle, $\beta_3$, of FIG. 1 increases, the $\beta$ signal derived from the receiver signals in FIG. 2 increases up to a limit determined by the antenna radiating aperture design (approximately 3°). Larger target angles associated with such targets do not produce a larger $\beta$ angle signal. Accordingly, a target lying below the clearance plane and at a negative target angle larger than that producing a maximum $\beta$ signal would produce too small a $\beta$ signal to properly bias the term $(H_o/R -N')$ of Equation 5 (corresponding to locus 85 of FIG. 6, where $t_R$ approaches zero). Hence, a signal difference of positive sense would result, producing a false warning signal, $+\Delta\gamma$. Therefore, in the design of a preferred embodiment of a system employing the concepts of the invention, means would preferably be included for shaping or providing upper limiting of the $H_o/R$ signal, in order to avoid false warning signals due to system response to obstacles at negative target angles outside the linear region of the antenna response. Also, means would preferably be provided to prevent observer confusion arising from an indicator display, due warning signals of a negative sense, indicating obstacles lying below the desired clearance plane. Further, means would preferably be included to prevent false warning signals of positive sense arising due to system transients, in response, for example, to terrain obstacles near to, but lying below, the desired clearance plane.

Figure 7:
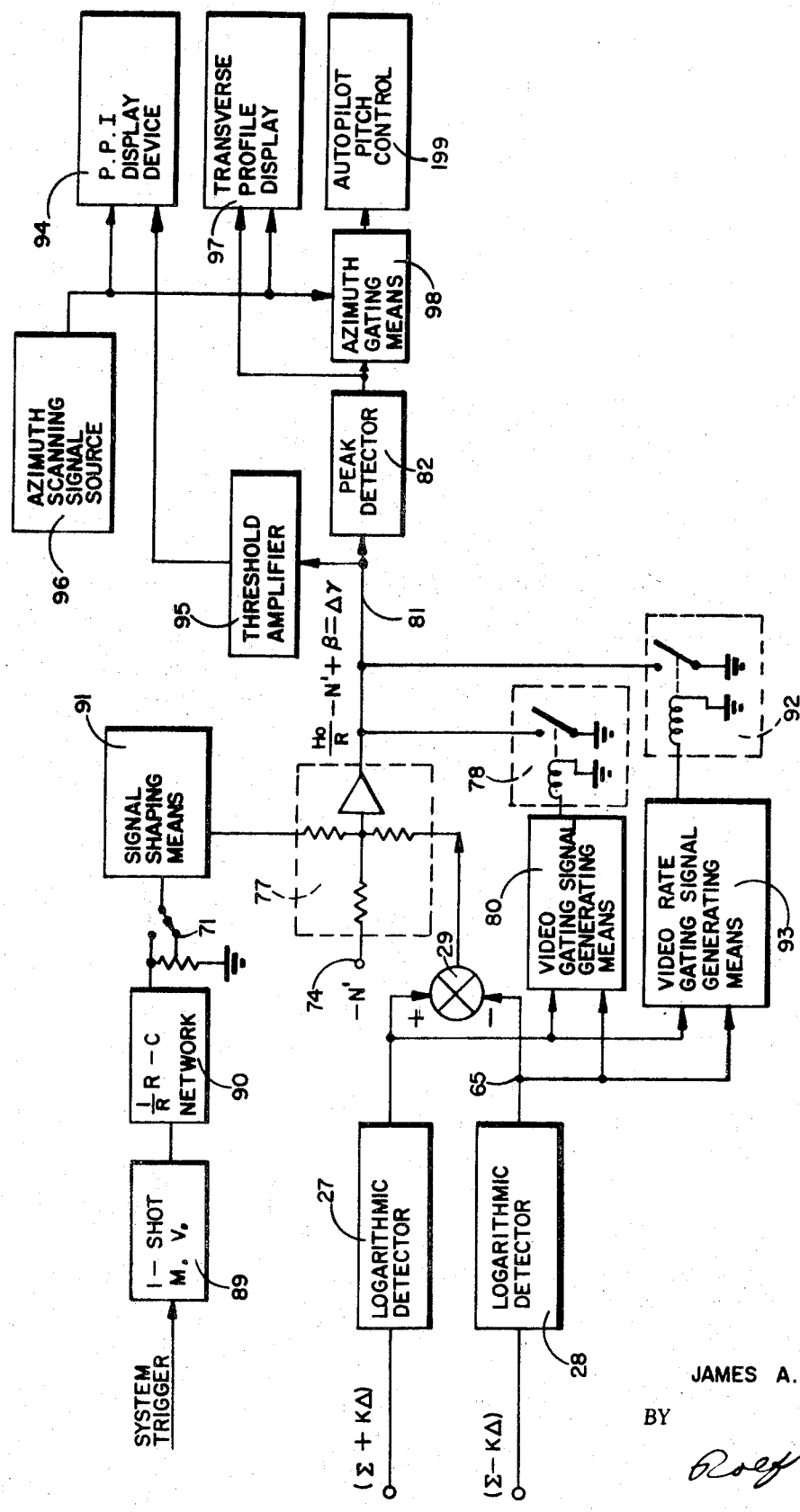
FIG. 7 is a functional block diagram of a preferred embodiment of the invention.

Such a preferred embodiment is shown in FIG. 7.

Referring to FIG. 7, there is illustrated a block diagram of a preferred embodiment of the invention. There is provided first and second logarithmic detection means 27 and 28, video gating means 78, video gating signal generating means 80, and video comparator 29, all similarly constructed and arranged to cooperate as like referenced elements of FIGS. 2 and 5. There is further provided a one shot multivibrator 89 responsively connected to the system trigger of FIG. 2, and having a response time equal to approximately one half the period of the periodic trigger for providing a clamping signal. The construction of such single-shot or monostable multivibrator is well known in the art, and element 89 is therefore shown in block form only. A resistance and capacitance network 90 (to be more fully described hereinafter) is responsively coupled to the positive clamp output of multivibrator 89 for generating a d-c signal indicative of an inverse function of range time, $t_R$. The output of network 90 is attenuated or scaled by means of potentiometer 71 to provide a signal indicative of the function $H_o/R$, where $H_o$ is a constant representing a specific desired clearance distance.

The $H_o/R$ signal is fed to signal shaping means 91 for providing upper limiting of the amplitude of the function $H_o/R$ (e.g., $H_o/R$ is made to limit as R approaches zero). The effect of such upper limiting is to limit the sum $(H_o/R -N')$, shown as locus 85 in FIG. 6, to a value less than the maximum $-\beta$ signal available for a given antenna system. In this way, the maximum $\beta$ signal associated with a target below the clearance plane will avoid producing a positive or false warning signal $(+\Delta\gamma)$, when combined with the limited sum signal, $(H_o/R$ LIM $-N')$. Hence, no warning signal is generated in response to targets lying below a maximum negative target angle, $(-\beta_{max} = H_o/R$ LIM $-N')$.

Such limiter may be comprised of a zenor diode network or other means well known in the art for effecting signal limiting. Accordingly, limiter 91 is shown in block form only.

The scaled $H_o/R$ periodic output signal of element 91, the $(-N')$ signal on terminal 74, and the video $\beta$ signal output of comparator 29 are fed to amplifier 77 to provide an output signal on line 81 which is continuously indicative of the sum of the amplitudes of the inputs thereto. Gating of the output sum signal on line 81 in response to video gating signals from video gating signal generating means 80, is provided by means of video gate 78 operatively connected across the output of summing amplifier 77. Hence, means is provided for allowing a finite signal (other than zero) on line 81 only in coincidence with a video target signal on lines 49 and 66.

There is further provided a video rate gate 92 and video rate gate signal generating means 93. Rate gate 92 is connected across signal line 81 for gating signals thereon in response to rate-gating signals from rate signal generator 93. Rate-gate signal generator 93 is responsively connected to the output of detectors 27 and 28 for providing a gating signal when the combined magnitude of the rate of the outputs from detectors 27 and 28 exceeds a predetermined limit. Such limit may be exceeded, for example, due to transients in the initial response of detectors 27 and 28 resulting in an erroneously large $+\beta$ signal at the output of comparator 29, which would otherwise cause an erroneous sum signal on line 81. However, in normal cooperation of elements 92 and 93, rate gate 92 suppresses the summed signal on line 81 only during the period of the initial transients of the video signals on lines 49 and 65. Hence, it is to be appreciated that elements 92 and 93 provide means for suppressing video signal transients.

While gating means 78 and 92 have been functionally illustrated as relay-operated switches in FIG. 7, it is to be appreciated that such switches must be high speed switches; and may be transistorized switching circuits, for example, or any means well known in the art for providing high sped switching of video signals.

Hence, it is to be appreciated that a video maneuver angle signal, $\Delta\gamma$, is provided, which is substantially free of transients.

In an azimuth scanning system, in which the antenna 22 of FIG. 2 is made to cyclically scan in azimuth, such $\Delta\gamma$ signal, in conjunction with a source 96 of a signal indicative of the azimuth being scanned, may be employed by a PPI device (Plan Position Indicator) 94. By means of a threshold amplifier 95 or other device functionally analogous to a unipolar responsive element, only $\Delta\gamma$ signals of a positive sense are caused to paint a representation of the plan position of a terrain obstacle as a function of range and azimuth, the time phase of the video signal providing the range information to the display indicator. In this way, multiple targets along a given azimuth may appear, as suggested by response curve 87 of FIG. 6. Where a transverse profile or transverse display of silhouette versus azimuth is desired, such signal may be employed by a profile display indicator 97, in conjunction with the azimuth signal from azimuth scanning means 96. By means of a peak detector 82, interposed between line 81 and indicator 97, $\Delta\gamma$ signals of maximum positive amplitude for a given azimuth may be developed as a function of azimuth.

Such peak detected video maneuver angle signal, $+\Delta\gamma_{max}$, may also be employed in conjunction with an azimuth gate 98 to provide pitch control signals to a pitch autopilot 199. In such an arrangement, the azimuth gate 98 is responsively connected to azimuth scanning signal source 96 to allow only $(+\Delta\gamma)$ maneuver angle signals corresponding to zero azimuth (e.g., the aircraft heading) to be transmitted to such pitch autopilot. In the absence of an antenna azimuth scanning feature, such azimuth gating would not be required for a pitch autopilot control mode.

Figure 8:
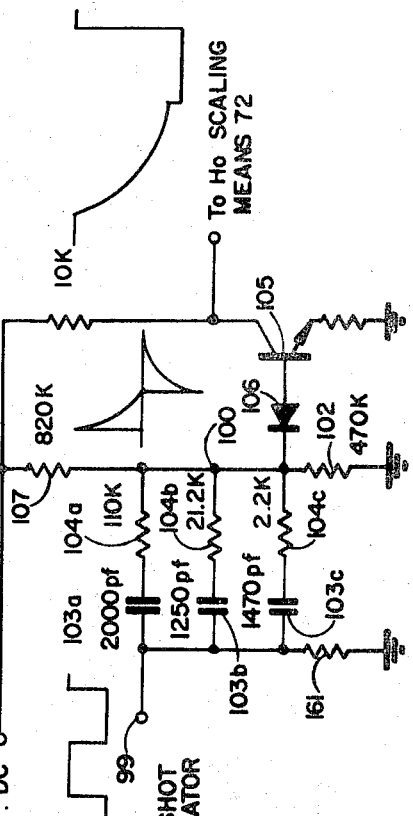
FIG. 8 is an examplary mechanization of the R-C network in FIG. 7 for generating a signal inversely proportional to periodic elapsed time.
Figure 9:
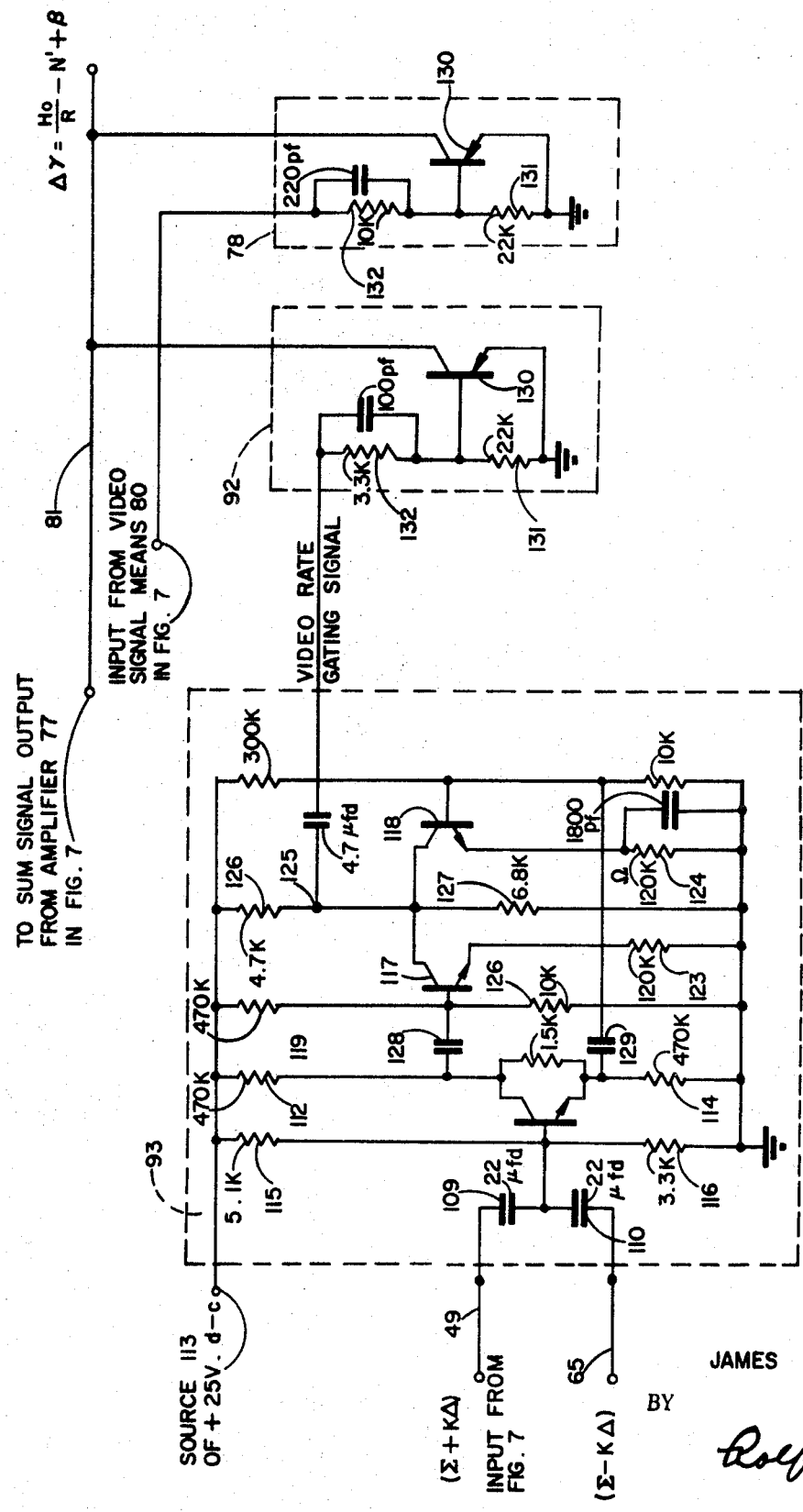
FIG. 9 is an exemplary mechanization of the video rate-gating means of FIG. 7.

Exemplary mechanizations of the inverse range R-C network 90 and the video rate gating combination (elements 93 and 92) of FIG. 7 are shown in FIGS. 8 and 9.

Referring to FIG. 8, there is illustrated an exemplary mechanization of an R-C network for generating a signal inversely proportional to a periodic time interval of 488 microseconds. There is provided an input terminal 99, an output terminal 100, and a third input-output terminal or common ground terminal. An input resistor 101 is connected across input terminal 99 and ground, and an output resistor 102 is connected across output terminal 100 and ground. There are also provided three R-C networks connected in parallel across input and output terminals 99 and 100. The first network is comprised of capacitor 103a having one of its two terminals connected to input terminal 99, and resistor 104a having one of its two terminals connected to output terminal 100, the second terminals of capacitor 103a and resistor 104a being interconnected, thereby interconnecting resistor 104a and capacitor 103a in series circuit. A second network comprised of capacitor 103b and resistor 104b, and a third network comprised of capacitor 103c and resistor 104c are similarly connected in circuit. The output on terminal 100 is fed to a first amplifier stage (transistor 105) through a unidirectional conducting element 106, to prevent transmitting an output response of the described networks due to the shutting-off or second change of state of signals from multivibrator 89 of FIG. 7. In this way, a unipolar output is provided in response only to multivibrator 89 being turned on by the system trigger.

Further, a bias resistor 107 is connected across a 25 volt d-c supply for the amplifier transistor 105 and the network output terminal 100. The purpose of bias resistor 107 is to co-operate with output resistor 102 to bias transistor 105 at a cut off voltage corresponding to a maximum range $R_{max}$ or minimum $1/R_{max}$. The values employed for the R-C network elements 103a, 103b, 103c, 104a, 104b, and 104a are selected to provide a describing function corresponding to the inverse of time or radar range. Such describing function will not be accurate for minimum time intervals approaching zero (e.g., $1/R_{max} \to \infty$) for the reason that the input applied to input terminal 99 is of a finite, limited amplitude. However, such inaccuracies are not significant for the reason that the output of the 1/R generator is limited by the limiter action of element 91 in FIG. 7.

Referring to FIG. 9, there is illustrated an exemplary mechanization of the video rate gating means of FIG. 7, comprising gating switch 92' and gating control signal means 93. Signal means 93 is comprised of a summing network responsively connected for continuously providing a signal indicative of the combined rates of the video signals on lines 49 and 65 of FIG. 7. There is further provided an amplifier-inverter stage comprising transistor 111.

The collector-emitter circuit of transistor 111 is comprised of a first resistor 112 interconnecting one electrode of the collector and emitter electrodes of transistor 111 to the positive terminal of a source 113 of d-c potential and a second resistor 114 interconnecting the other of the collector and emitter electrodes of transistor 111 to the grounded negative terminal of the source 113 of d-c potential. The base electrode of transistor 111 is operatively connected to rate summing capacitors 109 and 110, and is conventionally forward biased to conduction by means of impedances 115 and 116 interconnecting the base electrode to the positive and negative sides, respectively, of the d-c potential source 113.

There is further provided in signal means 93, a unipolar output circuit combination comprising like-poled transistors 117 and 118. The base electrodes of each of transistors 117 and 118 are severally back-biased below conduction by conventional means, including resistors 119 and 120 for transistor 117 and resistors 121 and 122 for transistor 118. The emitter-collector circuit for each of transistors 117 and 118 is comprised of resistor 123 connecting one of the emitter and collector electrodes of transistor 117 to the negative side of d-c source 113, and a resistor 124 connecting a like one of the emitter and collector electrodes of transistor 118 to the negative side of d-c source 113. The other electrode of the collector and emitter electrodes of each of transistors 117 and 118 is connected to common output terminal 125. An output impedance network is provided by resistor 126 connected across output terminal 125 and the positive side of d-c source 113, and by resistor 127 connected across output terminal 125 and the negative side of d-c source 113. The base electrode of transistor 117 is coupled to one of the collector and emitter electrodes of transistor 111 by means of a capacitor 128, and the base electrode of transistor 118 is coupled to the other of the base and collector electrodes of transistor 111 by means of a capacitor 129.

Transistor switch 92' is comprised of transistor 130 having its collector-emitter circuit connected across the output on line 81 from summing means 77 of FIG. 7. A resistor 131 is connected across the base electrode of transistor 130 and ground, and a resistor 132 connects that base electrode to the output terminal of signal means 73. (A capacitor is interposed in circuit between terminal 125 and resistor 132 to provide blocking of d-c source 113).

In normal operation of the above described combination, the emitter-collector circuit of switching transistor 130 resembles an inifinitely large impedance or open-switch in the absence of input signals on lines 49 and 65 below a certain threshold rate. However, when video inputs exist on lines 49 and 65, these are fed to the base of transistor 111, then the emitter-collector circuit of transistor 111 produces two output signals, the phase of one being inverted relative to the other, each signal being fed to the base of a mutually exclusive one of transistors 117 and 118. For example, an input signal causing a rise in the emitter collector current of transistor 111, will increase the potential drop across resistor 124, thereby raising the potential of the base of transistor 118. Hence, transistor 118 is caused to conduct, thereby producing an increase in the potential drop across resistor 126, and a reduced potential at output terminal 125. It is to be noted that the increased emitter-collector currenter of transistor 111 increases the potential drop across resistor 112, which reduces the potential of the base of transistor 117. However, this phenomenon has no effect upon either the output current through resistor 126 or the potential at output terminal 125. The reason for this is that transistor 117, being initially biased just below conduction, is only back-biased further, thereby not effecting the nonconductive state of the emitter-collector circuit of transistor 117. If, however, the sense of the rates of change of the video inputs on lines 49 and 65 reduces the emitter-collector current of transistor 111, then the potential drop through each of resistors 112 and 114 decreases, causing the potential at the base of transistor 117 to be raised. Hence, transistor 117 is made to conduct, thereby increasing the potential drop across resistor 126 and, hence, reducing the potential at output terminal 125. Thus, it is to be seen that a unipolar output is provided at terminal 125 in response to at least a minimum rate of change of the combined video inputs from lines 49 and 65 which unipolar output is independent of the sense of such rate of change. The threshold or minimum value of such input video rate for which a unipolar output switching signal is provided, is determined or adjusted by the back-bias voltage employed for transistors 117 and 118.

The unipolar switching signal on output terminal 125 effects a reduction in the potential of the base of switching transistor 130, thereby causing the emitter-collector circuit to conduct for as long as the output signal appears on terminal 125, in response to the excess rate condition of the video inputs signals on lines 49 and 65. This conductive condition of switching-transistor 130 resembles a low impedance condition or short-circuit across output line 81, which serves to gate or clamp such output to ground during the occurrence of such condition.

While the construction of a high-speed transistor switch 92' has been described for video rate gating signal means 93, it is to be appreciated that video signal strength gating means 78' may be similarly constructed and arranged for cooperation with video gating signal means 80 in FIG. 7.

Hence, it is to be appreciated that useful and improved means is provided for computing a terrain avoidance monopulse signal without resort to phase detectors, analog multipliers and analog dividers. Thus, the device of the invention provides a substantially improved monopulse terrain avoidance computer of increased reliability, and having less gain and phase tracking errors.

Although the invention has been described and illustrated in detail, it is to be clearly understood that the same is by way of illustration and example only, and not to be taken by way of limitation, the spirit and scope of this invention being limited only by the terms of the appended claims.

I claim:

1. In a monopulse receiver system having a depressed antenna and having a first and second signal channel indicative of the microwave output from a first and second one respectively of two coplanar antenna elements, target angle detection means comprising: first and second logarithmic gain means responsively connected to said first and second signal channel respectively for providing an output as a logarithmic function of the amplitude of the respective inputs thereto; and a signal amplitude comparator responsively connected to the outputs of said first and second logarithmic gain control means for providing a target signal output indicative of the difference therebetween, each of said logarithmic gain control means comprising automatic gain control means including video output means and a logarithmic-shaping feedback network responsively coupled to the output of said video output means.

2. The device of claim 1 in which each said logarithmic gain control means comprises: automatic gain control means including video output means and a logarithmic shaping feedback network responsively coupled to the output of said video output means including: an input terminal; an output terminal; a common input-output ground terminal; a bias terminal; capacitive coupling for responsively coupling the output terminal of said network to said video output means; a series resistor interconnecting said input and output terminals of said shaping network; a plurality of like-poled back-biased diode circuits each comprising a diode, a current limiting resistor, and a back-biasing resistor, a like electrode of each said diodes being commonly connected to said output terminal of said network, said current limiter resistor interconnecting a second electrode of said diode and said ground terminal, said back-biasing resistor interconnecting said second electrode and said bias terminal of said network; a pair of series-connected oppositely-poled diodes connected in circuit across the input terminal and ground terminal of said network, a first one of said diodes being connected to said input terminal and being oppositely poled relative to said plurality of like-poled diode circuits, the series interconnection of said series diodes being interconnected to said bias terminal of said network by means of a bias impedance; and a source of d-c potential connected across said input terminal and bias terminal of said shaping network for back-biasing said plurality of diode circuits.

3. In a monopulse receiver system having an antenna, signal indicating means comprising logarithmic means responsively connected to said antenna for generating a first signal indicative of the angle off boresight of a terrain obstacle, bias signal means for generating a second signal indicative of the angle of said antenna, with respect to a preselected flight path, periodic signal generating means for generating a third signal indicative of an inverse function of monopulse range time; and warning signal means responsive to said first, second, and third signals for providing a fourth signal indicative of the clearance angle defined by the position of said terrain obstacle relative to a preselected flight path.

4. The device of Claim 3 in which said signal generating means is responsively connected to a system trigger of said receiver for generating a signal indicative of the function $H_o/R$, where, $H_o$ equals a preselected clearance and R substantially equals the range to the obstacle.

5. The device of claim 3, wherein said receiver system provides a sum and difference signal and said logarithmic means comprises means providing logarithmic gain controlled amplification of the sum of said sum and difference signal and the difference of said sum and difference signal.

6. The device of claim 3 in which said warning signal means comprises signal combining means responsive to said first, second, and third signals for providing an output signal indicative of the combination of the amplitude thereof, and signal gating means responsive to said receiver system for suppression of said output in the absence of a receiver signal below a predetermined magnitude.

7. The device of claim 3 including means for suppressing warning signal transients comprising a differentiating circuit responsive to the video output provided by said monopulse receiver for providing a signal indicative of the first derivative thereof, and second signal gating means responsive to said differentiating circuit for suppressing said fourth signal when the first derivative of said video receiver output exceeds a predetermined amplitude.

8. In a monopulse receiver system having an antenna and including a first and second signal channel indicative of the output from a first and second signal, respectively, terrain avoidance signaling means comprising first and second logarithmic gain control means responsively connected to said first and second signal channel, respectively, for providing an output as a logarithmic function of the amplitude of the respective input thereto; a signal amplitude comparator responsively connected to the outputs of said first and second logarithmic gain control means for providing a target signal output indicative of the difference therebetween; computing means for comparing said target angle signal with a reference signal for providing a warning signal; and signal suppression means responsively connected to said first and second logarithmic gain control means for suppressing said warning signal when the sum of the outputs from said first and second logarithmic gain control means is less than a predetermined signal limit.

9. The device of Claim 8 in which said computing means includes means for providing a reference signal indicative of the term $(H_o/R - N')$, where: $N'$ is the angle of the axis of said antenna relative to a preselected reference plane, $H_o$ is a preselected clearance altitude relative to said reference plane and R is a function of time equivalent to radar range.

10. The device of claim 8 in which said computing means includes a source of a bias signal indicative of the ratio angle $N'$ and a signal generator responsive to said system trigger for generating a periodic signal as an inverse function of time indicative of the term $H_o/R$.

11. The device of claim 8 additionally comprising transient signal suppression means responsively connected to said first and second logarithmic gain control means for suppressing said warning signal when the sum of the rates of change of the outputs from said logarithmic gain control means exceeds a predetermined limit.

12. The device of claim 8 in which said logarithmic gain control means includes automatic gain control means having video output means, and a logarithmic gain shaping network responsively connected to said output means and comprising: an input terminal; and output terminal; a common input-output ground terminal; a bias terminal; capacitive coupling for responsively coupling the output terminal of said network to said video output means; a series resistor interconnecting said input and output terminals of said shaping network; a plurality of like-poled back-biased diode circuits each comprising a diode, a current limiting resistor, and a back-biasing resistor, a like electrode of each said diodes being commonly connected to said output terminal of said network, said current limiter resistor interconnecting a second electrode of said diode and said ground terminal, said back-biasing resistor interconnecting said second electrode and said bias terminal of said network; a pair of series-connected oppositely-poled diodes connected in circuit across the input terminal and ground terminal of said network, a first one of said diodes being connected to said input terminal and being oppositely poled relative to said plurality of like-poled diode circuits, the series interconnection of said series diodes being interconnected to said bias terminal of said network by means of a bias impedance; and a source of d-c potential connected in circuit across said input terminal and bias terminal of said shaping network for back-biasing said plurality of diode circuits.

13. A warning system adapted to receive the sum and difference signals of a monopulse radar comprising: first logarithmic amplification means adapted to receive the sum of said sum and difference signals, second logarithmic amplification means adapted to receive the difference of said sum and difference signals, means for subtracting the outputs of said logarithmic amplification means, and means for comparing output of said subtracting means with a reference signal for providing a warning signal.

14. The combination recited in claim 13 wherein said means for comparing comprises a means for generating said reference signal comprising means providing a signal indicating a minimum selected clearance ($H_o$) divided by a signal substantially inversely proportional to range ($1/R$), means indicating the angle of the boresight of the antenna of said monopulse radar with respect to a preselected flight path, and wherein said means for comparing combines the output of said latter two means with the output of said means for subtracting.

15. The combination recited in claim 13 wherein is included means gating the output of said comparing means in response to the sum of the output of said logarithmic amplification means.

16. Logarithmic amplifying means comprising automatic gain control means including video output means and a logarithmic shaping feedback network responsively coupled to the output of said video output means including: an input terminal; an output terminal; a common input-output ground terminal; a bias terminal; capacitive coupling for responsively coupling the output terminal of said network to said video output means; a series resistor interconnecting said input and output terminals of said shaping network; a plurality of like-poled back-biased diode circuits each comprising a diode, a current limiting resistor, and a back-biasing resistor, a like electrode of each said diodes being commonly connected to said output terminal of said network, said current limiter resistor interconnecting a second electrode of said diode and said ground terminal, said back-biasing resistor interconnecting said second electrode and said bias terminal of said network; a pair of series-connected oppositely-poled diodes connected in circuit across the input terminal and ground terminal of said network, a first one of said diodes being connected to said input terminal and being oppositely poled relative to said plurality of like-poled diode circuits, the series interconnection of said series diodes being interconnected to said bias terminal of said network by means of a bias impedance; and a source of d-c potential connected across said input terminal and bias terminal of said shaping network for back-biasing said plurality of diode circuits.

* * * * *